United States Patent [19]

Araki et al.

[11] Patent Number: 5,473,153
[45] Date of Patent: Dec. 5, 1995

[54] LIGHT INTENSITY CONTROL CIRCUIT FOR AN OPTICAL SCANNING UNIT

[75] Inventors: Yoshiyuki Araki; Satoshi Takami, both of Tokyo, Japan

[73] Assignee: Asahi Kogaku Kogyo Kabushiki Kaisha, Tokyo, Japan

[21] Appl. No.: 296,413

[22] Filed: Aug. 26, 1994

[30]   Foreign Application Priority Data

Aug. 28, 1993  [JP]  Japan .................................. 5-235366

[51] Int. Cl.⁶ .................................................. G01J 1/32
[52] U.S. Cl. .......................... 250/205; 250/235; 358/494
[58] Field of Search .................................. 250/205, 234, 250/235, 236; 358/475, 494

[56]           References Cited

U.S. PATENT DOCUMENTS

| | | |
|---|---|---|
| 4,679,057 | 7/1987 | Hamada . |
| 4,700,058 | 10/1987 | Belanger et al. .................. 250/205 |
| 4,727,382 | 2/1988 | Negishi et al. . |
| 4,761,659 | 8/1988 | Negishi . |
| 4,831,247 | 5/1989 | Ishizaka ............................. 250/205 |
| 4,879,459 | 11/1989 | Negishi . |
| 4,907,236 | 3/1990 | Shimada . |
| 5,225,850 | 7/1993 | Egawa et al. ..................... 346/108 |
| 5,305,337 | 4/1994 | Araki et al. . |
| 5,309,463 | 5/1994 | Kasai . |
| 5,369,272 | 11/1994 | Eguchi ............................. 250/235 |

FOREIGN PATENT DOCUMENTS

| | | |
|---|---|---|
| 61-124921 | 6/1986 | Japan . |
| 2-14163 | 1/1990 | Japan . |

*Primary Examiner*—Edward P. Westin
*Assistant Examiner*—Stephen Calogero
*Attorney, Agent, or Firm*—Sandler, Greenblum & Bernstein

[57]            ABSTRACT

A light intensity control circuit for an optical scanning device in which an intensity of a beam emitted by a laser diode, is modulated in accordance with an image signal. The image signal includes information about gradation levels of an image to be formed by the scanning device on a photoconductive surface. A first control circuit sets a first intensity value of the beam corresponding to a minimum gradation level of the image to be formed, and a second circuit sets a second intensity value of the beam corresponding to a maximum gradation level of the image to be formed. A driving circuit drives the laser diode such that the intensity of the beam is determined in accordance with the image signal and a difference between the first intensity value and the second intensity value.

10 Claims, 6 Drawing Sheets

LIGHT INTENSITY CONTROL CIRCUIT FOR AN OPTICAL SCANNING UNIT

BACKGROUND OF THE INVENTION

The present invention relates to an optical scanning unit having a scanning laser beam. More specifically, the invention relates to a light intensity control circuit for modulating a scanning laser beam used in an electrophotographic printer.

Conventionally, in an electrophotographic printer, an image is formed on a photoconductive drum by exposing the photoconductive drum to a scanning laser beam. In such a printer, in order to obtain a halftone image where each pixel can have a plurality of gradation levels, the laser beam is modulated so that energy applied to sequential pixels may be different. That is, the intensity of the laser beam and/or the period of time within which each pixel is exposed, may be changed. Conventionally, two of the more common methods for modulating a laser beam are pulse width modulation and amplitude modulation.

In the laser scanning unit, in order to obtain 256 levels of light intensity using pulse width modulation, the minimum exposing time of the laser beam should be set to 220 picoseconds. Practically, it is impossible to control the laser beam to turn ON and OFF within such a short period of time.

If the amplitude modulation method is used, the exposing period is constant, for example, 56 nanosecond. This period is relatively long, and it is possible to control the laser beam to turn ON and OFF over this period. Therefore, in amplitude modulation, the amplitude of the current applied to a laser diode can be varied in order to obtain the desired intensity level. In an electrophotographic printer having 256 intensity levels for the laser beam, 256 current levels are required.

In this system, the maximum intensity of the laser beam or black level, corresponding to a black image, is first established. Then, the other intensity levels are determined based on the black level. However, the characteristic of the laser diode may change below a certain threshold value. If a minimum level (i.e., white level) is below the threshold value, then for low current levels, the output of the laser diode will be similar over a range of current levels. In this case, a sufficient halftone image may not be obtained since the lower intensity range of the laser beam is not reproduced correctly.

Further, the threshold value varies according to temperature. Therefore, the lower levels of the current values may be higher or lower than the threshold value, depending on the temperature. This will result in inconsistent printing if the temperature varies slightly from one scanning line to the next scanning line.

SUMMARY OF THE INVENTION

It is, therefore, an object of the present invention to provide a light intensity control circuit with which predetermined upper and lower levels of gradation of an image can always be obtained.

It is another object of the present invention to provide a light intensity control circuit which can be used with an image forming apparatus to reliably form images having a plurality of gradation levels.

According to one aspect of the present invention, there is provided a light intensity control circuit for an optical scanning device in which an intensity of a beam emitted by a laser diode is modulated in accordance with an image signal, the image signal including information about gradation levels of an image to be formed by the scanning device on a photoconductive surface. The light intensity control circuit includes:

a first circuit for setting first a first intensity value of the emitted beam corresponding to a minimum gradation level of an image to be formed;

a second circuit for setting a second intensity value of the emitted beam corresponding to a maximum gradation level of the image to be formed; and a driving circuit for driving the laser diode such that the intensity of the emitted beam is determined in accordance with the image signal and a difference between the first and second intensity values.

According to another aspect of the present invention there is provided a method of setting an intensity of a laser beam used in a laser scanning unit for forming an image on a photoconductive surface, in accordance with an image signal, comprising the steps of:

determining a first intensity value of the beam which corresponds to a minimum gradation level of an image to be formed;

determining a second intensity value of the beam which corresponds to a maximum gradation level of the image to be formed; and setting an intensity of the beam, in accordance with the image signal and a difference between the first and second values.

According to a further aspect of the present invention, there is provided a light intensity control circuit for an optical scanning device in which an intensity of each pixel of a beam emitted by a laser diode is modulated in accordance with an image signal, which includes information about a gradation level of the pixel. The light intensity control circuit includes:

a first circuit for setting a first intensity value of the emitted beam corresponding to a minimum gradation level of the pixel;

a second circuit for setting a second intensity value of the emitted beam corresponding to a maximum gradation level of the pixel; and a driving circuit for driving the laser diode such that the intensity of the emitted beam for each of the pixels is determined in accordance with the image signal and a difference between the first and second intensity values.

DESCRIPTION OF THE ACCOMPANYING DRAWINGS

DESCRIPTION OF THE EMBODIMENTS

Figure 1A:
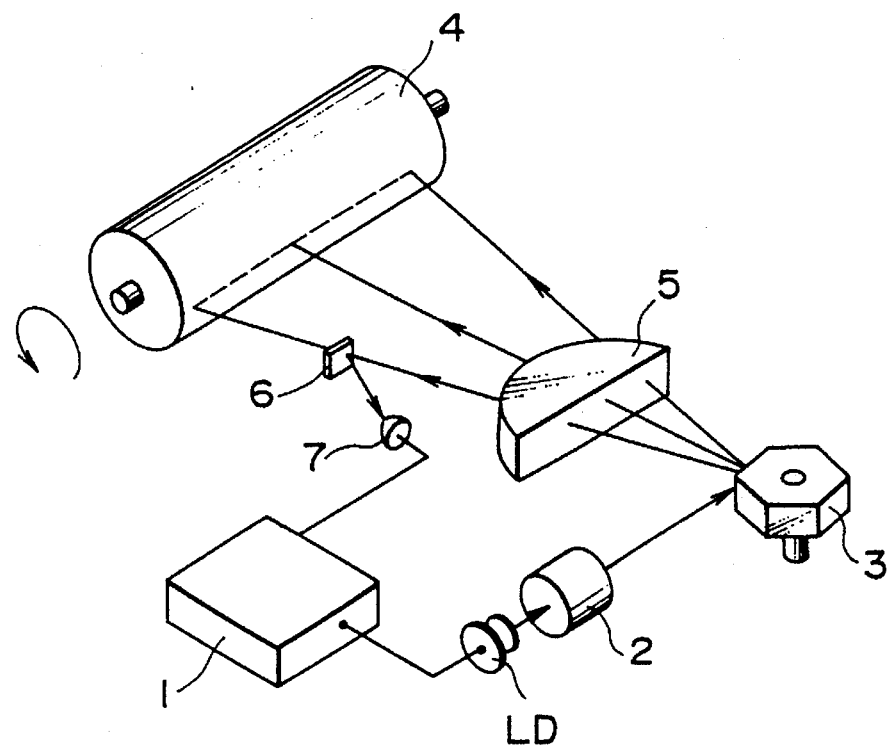
FIG. 1A shows a perspective view of a laser scanning unit having a light intensity control circuit, according to the present invention.

FIG. 1A is a perspective view of a laser scanning unit including a light intensity control circuit 1, which embodies the present invention. A laser diode LD emits a laser beam which has an intensity that depends on a value of the current output by the light intensity control circuit 1. The laser beam passes through a collimator lens 2 and is deflected by a polygonal mirror 3. The deflected beam passes through an fθ lens 5 and scans a circumferential surface of a rotating photoconductive drum 4, in a direction parallel to its axis of rotation. A mirror 6 is provided on a scanning plane of the laser beam and outside of the scanning area of the photoconductive drum 4. The mirror 6 reflects the beam to a photosensor 7 which outputs a detection signal that is used for generating a horizontal synchronous signal (hereinafter referred to as HSYNC), and for controlling the timing of the modulation of the laser beam.

Figure 1B:
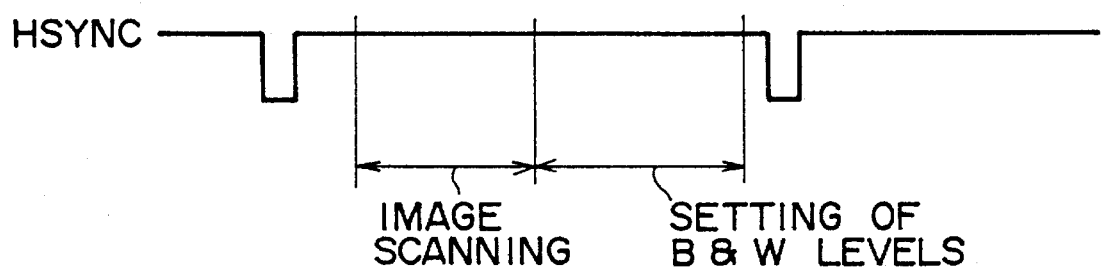
FIG. 1B shows a timing diagram of a scanning operation of the laser scanner shown in FIG. 1A.

FIG. 1B shows a timing diagram of the detection of the laser beam by the photosensor 7. The HSYNC pulse is output when the photosensor 7 detects the laser beam. In the first half of the interval between two successive HSYNC pulses, an image scanning operation is done. In the second half of the interval, the maximum and the minimum levels of the intensity of the laser beam are determined.

Hereinafter, in the specification, the maximum level of intensity of the laser beam is referred to as a black level, and the minimum level of intensity of the laser beam is referred to as a white level. If the photoconductive drum is exposed to the white level laser beam, toner will not adhere to the drum surface, while if the drum is exposed to the black level laser beam, toner will adhere to the drum surface in a saturated condition.

Figure 2:
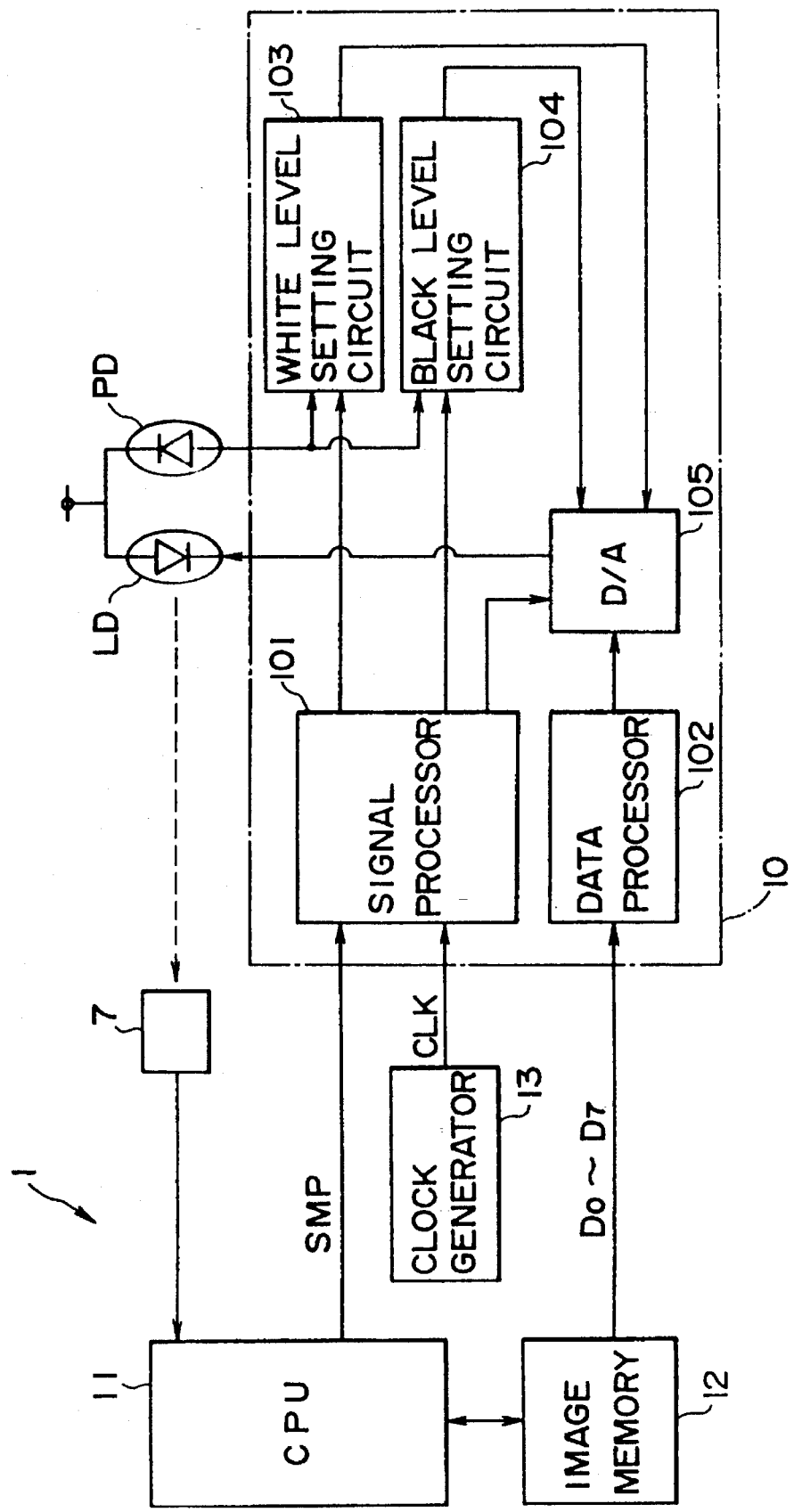
FIG. 2 shows a functional block diagram of the laser scanner shown in FIG. 1A.

FIG. 2 shows a block diagram of the laser driving circuit 1. Image data is stored in a image memory 12 in the form of 8 bit data, and represents data of an image having 256 gradation levels. The image data is transmitted from the image memory 12 to an intensity modulating circuit 10. A CPU 11 outputs a timing signal SMP based on the detection of the laser beam by the photosensor 7. An image clock generator 13 outputs a clock signal CLK to a signal processor 101 of the intensity modulating circuit 10. The intensity modulating circuit 10 controls the intensity of the laser beam emitted by the laser diode LD in accordance with the image data, the timing signal SMP and the clock signal CLK.

The intensity modulating circuit 10 is connected to the laser diode LD, and a photodiode PD. The signal processor 101 processes the timing signal SMP and the clock signal CLK. A data processor 102 is provided for handling the image data transmitted from the image memory 12. A white level setting circuit 103 and a black level setting circuit 104 are provided for setting the minimum and maximum current levels, respectively, that are to be applied to the laser diode LD. The minimum and maximum levels are based on the output current of the photodiode PD during the latter half of the interval between two successive HSYNC pulses.

An intensity setting circuit 105 determines, in accordance with the image data and the maximum and minimum current values, a current, which is within a range between the maximum and the minimum current values, and which is applied to the laser diode LD synchronously with the output signal of the signal processor 101.

Figure 3:
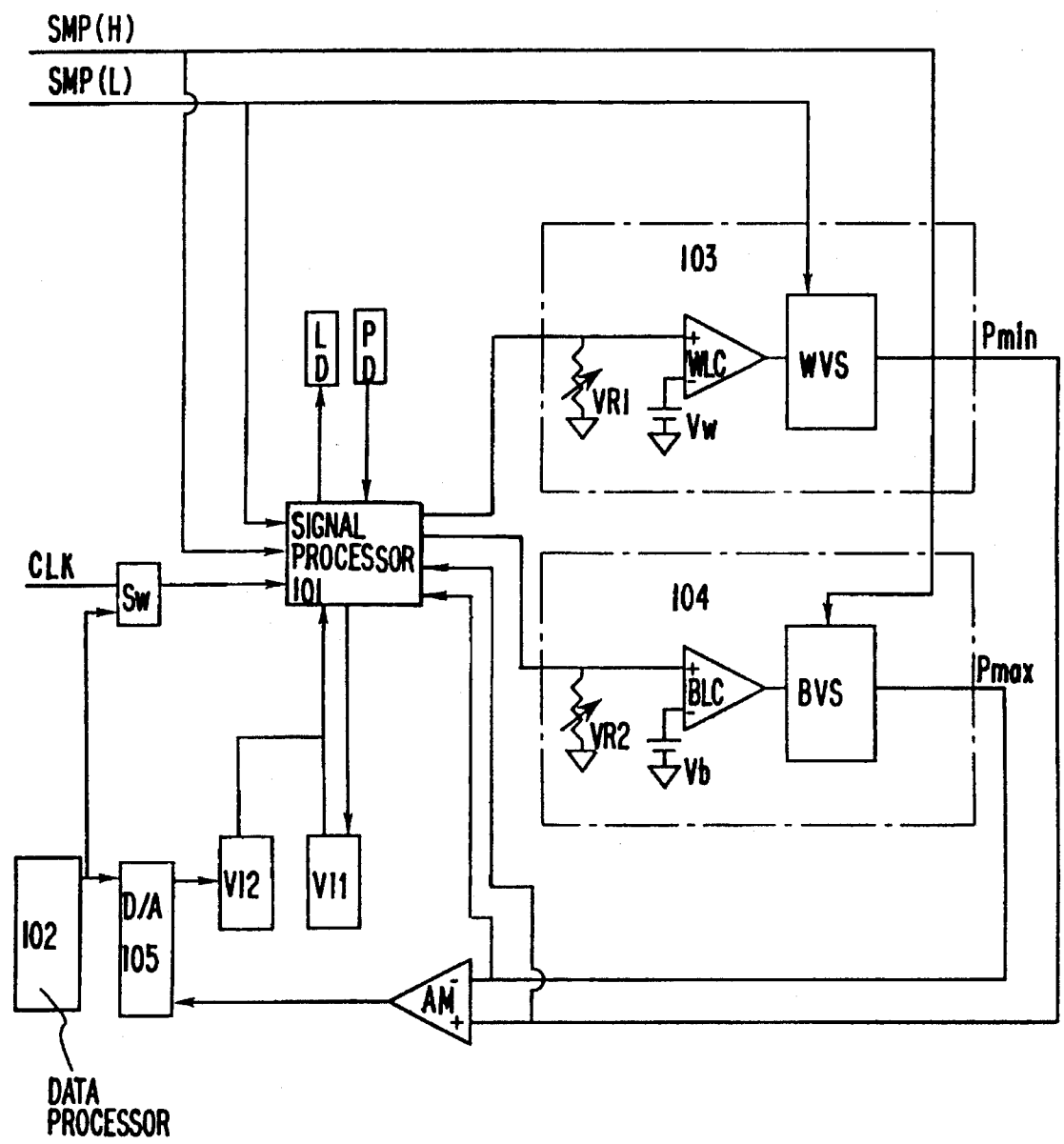
FIG. 3 shows a schematic block diagram of a laser modulating circuit according to the present invention.

FIG. 3 illustrates the intensity modulating circuit 10 in more detail.

Signal processor 101 uses various input control signals to determine which signals are sent to the laser diode LD. Current sources VI1 for APC (Automatic Power Control) and VI2 for intensity modulation are connected to the laser diode LD through the signal processor 101.

Thus, the output of the laser diode LD depends on the output of the current sources VI1 and VI2. Photodiode PD receives light from the laser diode LD and outputs a signal having a current which is proportional to the intensity of the light received. The output signal is fed to white level and black level setting circuits 103 and 104, respectively.

In this embodiment, voltage controlled current sources are employed. Thus, the voltage output by the white level and black level circuits 103 and 104 directly control the current generated by the current source VI1.

The operation of the intensity modulation circuit 10 will now be described.

The CPU transmits signals SMP(L) and SMP(H) as active low pulses (see FIG. 5) in order to calibrate the white level and black level respectively. Initially, SMP(L) is transmitted in order to determine the white level. The white level setting circuit 103 is enabled, with the white voltage setting unit WVS (hereinafter referred to as the WVS circuit) outputting voltage Pmin. This is then fed to the current source VI1 through the signal processor 101. The output of the current source VI1 is fed to the laser diode LD. The photodiode PD detects the output of the laser diode LD and outputs a current which produces a voltage across VR1. This voltage is compared with Vw, and if the voltage is greater than Vw, then H is output from the comparator WLC to the WVS circuit, and Pmin is decreased. If the voltage is lower than Vw, then L is output from the comparator WLC to the WVS circuit, and Pmin is increased. This feedback process is continued while SMP(L) is low and until the output of the comparator is 0.

After the white level has been set and SMP(L) is high, CPU 11 outputs the SMP(H) active low pulse. The black level setting circuit 104 is enabled, with the black voltage setting unit BVS (hereinafter referred to as the BVS circuit) outputting voltage Pmax. This is then fed to the current source VI1 through the signal processor 101. The output of the current source VI1 is fed to the laser diode LD. The photodiode PD detects the output of the laser diode LD and outputs a current which produces a voltage across VR2. This voltage is compared with Vb, and if the voltage is greater than Vb, then H is output from the comparator BLC to the BVS circuit, and Pmax is decreased. If the voltage is lower than Vb, then L is output from the comparator BLC to the BVS circuit, and Pmax is increased. This feedback process is continued while SMP(H) is low and until the output of the comparator is 0.

After the setting of the white and black levels is completed, the HSYNC pulse is output and data corresponding to an image to be formed, can be sent to the laser diode.

A difference amplifier AM outputs a difference signal, which represents the voltage difference between Pmax and Pmin, as a reference voltage signal, to a D/A converter 105. In this embodiment, 8 bit data is used, with data D having the range [00000000] to [11111111]. Thus, voltage difference Vd is divided into 256 levels to represent all possible gradation levels or image density levels, that can be formed on the photoconductive drum, by each pixel.

Therefore, data D is D/A converted by the D/A converter 105, to produce one of the 256 voltage levels P, where P is defined by the following:

$$P=Pmin+Vd \times D/255.$$

The output voltage is fed to the current source VI2, where a current is output. This is then fed to the laser diode LD to form the image.

In the above process, if data D has a value 0, then the clock signal CLK is deactivated and no signal is sent to the laser diode LD. This ensures that any noise which may corrupt the signal output from the current source does not result in a non-white image being formed. Therefore, a fog-phenomenon can be avoided. Further, until the image data is transmitted, the current source VI2 outputs the driving current.

Figure 6:
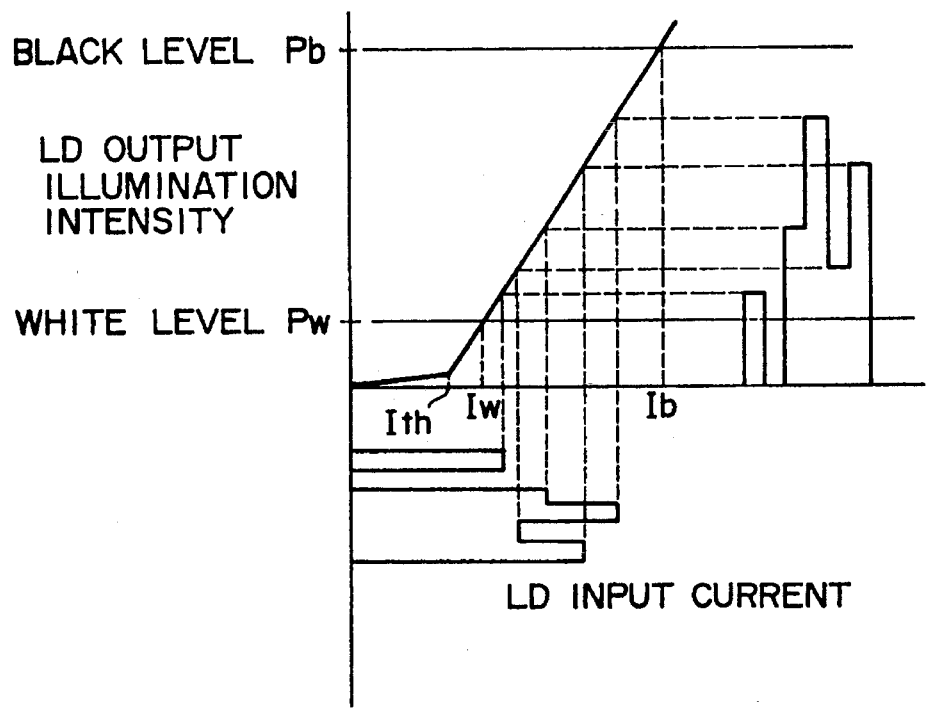
FIG. 6 shows an I–P characteristic of a laser diode used in the present invention.

As shown in FIG. 6, current Iw, corresponding to the white level, is higher than a threshold current Ith, and therefore, the reliability of the gradation levels can be ensured. Further, the current Iw can be set such that it is always higher than the threshold current Ith, over the entire operating temperature range of the diode LD. Current Ib represents the current corresponding to the black level.

As described above, image scanning is performed in the first half of the interval between HSYNC pulses, while the re-setting of the white and black levels is done in the latter half of the interval. Even if the I–P characteristic or the value of the threshold Ith fluctuates due to a change in the ambient temperature, since the setting of the white and black levels is executed for each scanning, the quality of the image formed is constant.

Figure 4:
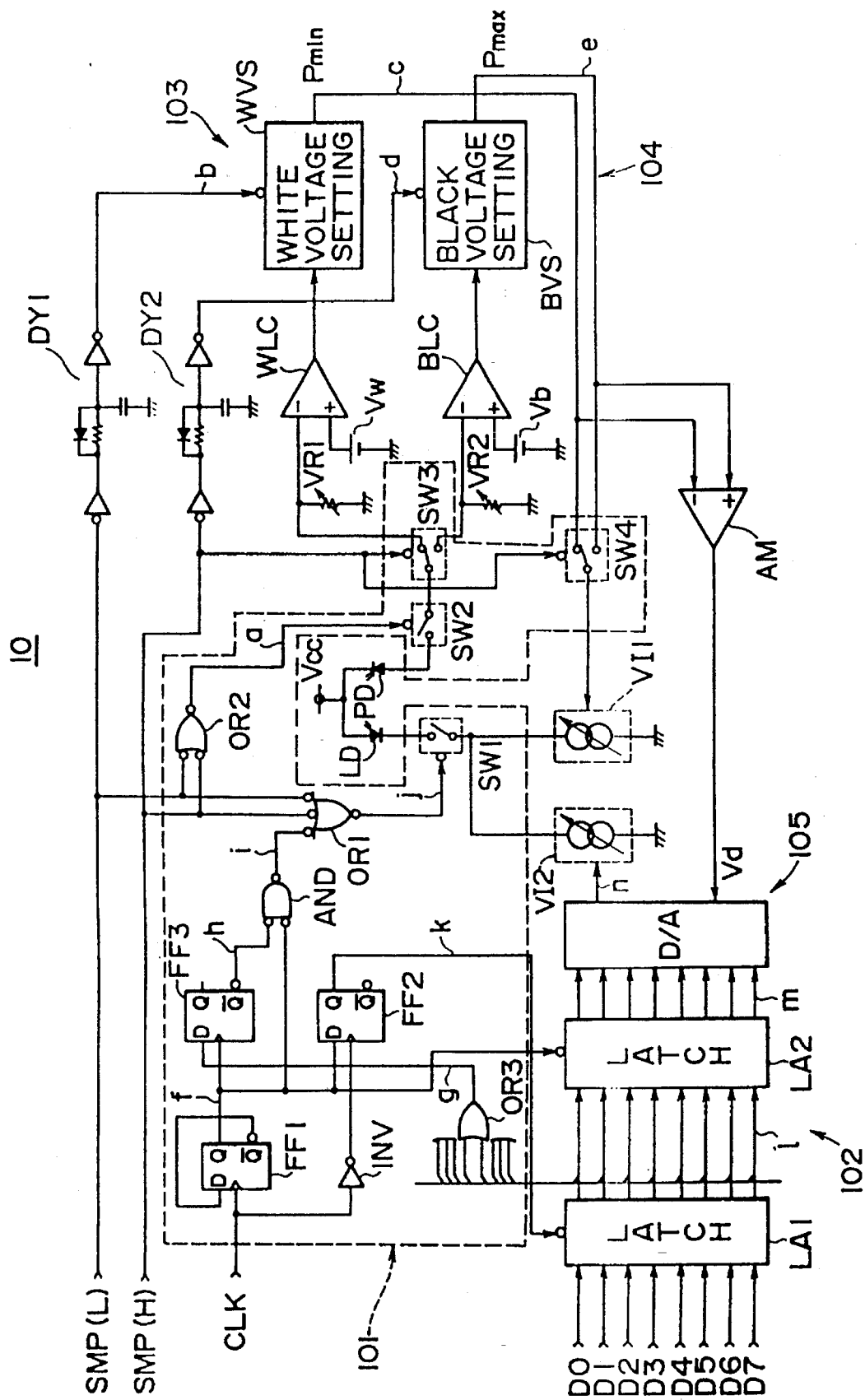
FIG. 4 shows a schematic of a circuit used to implement the laser modulating circuit, according to the present invention.

FIG. 4 is a circuit diagram illustrating a circuit used to implement the present invention. Some of the elements which are common to both the block diagram of FIG. 3 and the circuit schematic of FIG. 4, will have the same reference numerals, and will not be described below in detail.

In the circuit diagram of FIG. 4, logic gates, flip-flops and switches which form signal processor 101, are shown.

The white level timing signal SMP(L) and the black level timing signal SMP(H) are inputted to a first OR circuit OR1 and a second OR circuit OR2. The output signal of the the OR circuit OR1 is used as a control signal for a first switch SW1. The output signal of the second OR circuit OR2 is used as a control signal of a second switch SW2.

Further, the white level timing signal SMP(L) and the black level timing signal SMP(H) are passed through delay circuits DY1 and DY2, respectively, and are used as control signals for the white voltage setting unit WVS, and the black voltage setting unit BVS. Furthermore, the black level timing signal SMP(H) is used to directly control third and fourth switches SW3 and SW4.

First and second latch circuits LA1 and LA2 latch image data DO–D7. Output data 'm' of the second latch circuit LA2 is converted to an analog voltage signal by the D/A converter. The differential voltage Vd is also applied to the D/A converter, as described above. The D/A converter outputs an analog voltage signal 'n', to the current source VI2 in order to modulate the intensity of the laser diode.

The clock signal CLK is inputted to a first D-type flip-flop circuit FF1 and is divided by two. The divided clock signal is used as a latch timing signal for a second latch circuit LA2. The divided clock signal and the clock signal CLK are inputted a second D-type flip-flop FF2. The flip-flop FF2 outputs a clock signal having a 90 degree phase shift. This phase-shifted signal 'k', is used as a latch timing signal for the first latch circuit LA1. Output data '1' of the first latch circuit LA1 is applied to a third OR circuit OR3. Output signal 'g' of the third or circuit OR3 is applied to a third flip-flop FF3 together with the divided clock signal. Output signal 'h' of the third flip-flop FF3 is inputted to an AND circuit together with the divided clock signal. The output signal of the AND circuit is fed to the first OR circuit OR1.

The white level timing signal SMP(L) and the black level timing signal SMP(H) are input to the first OR circuit OR1 and the second OR circuit OR2. Output signal 'j' (see FIG. 5), of the first OR circuit OR1 is used as a control signal for the first switch SW1. Output signal 'a' of the second OR circuit OR2 is used as a control signal of the second switch SW2.

Figure 5:
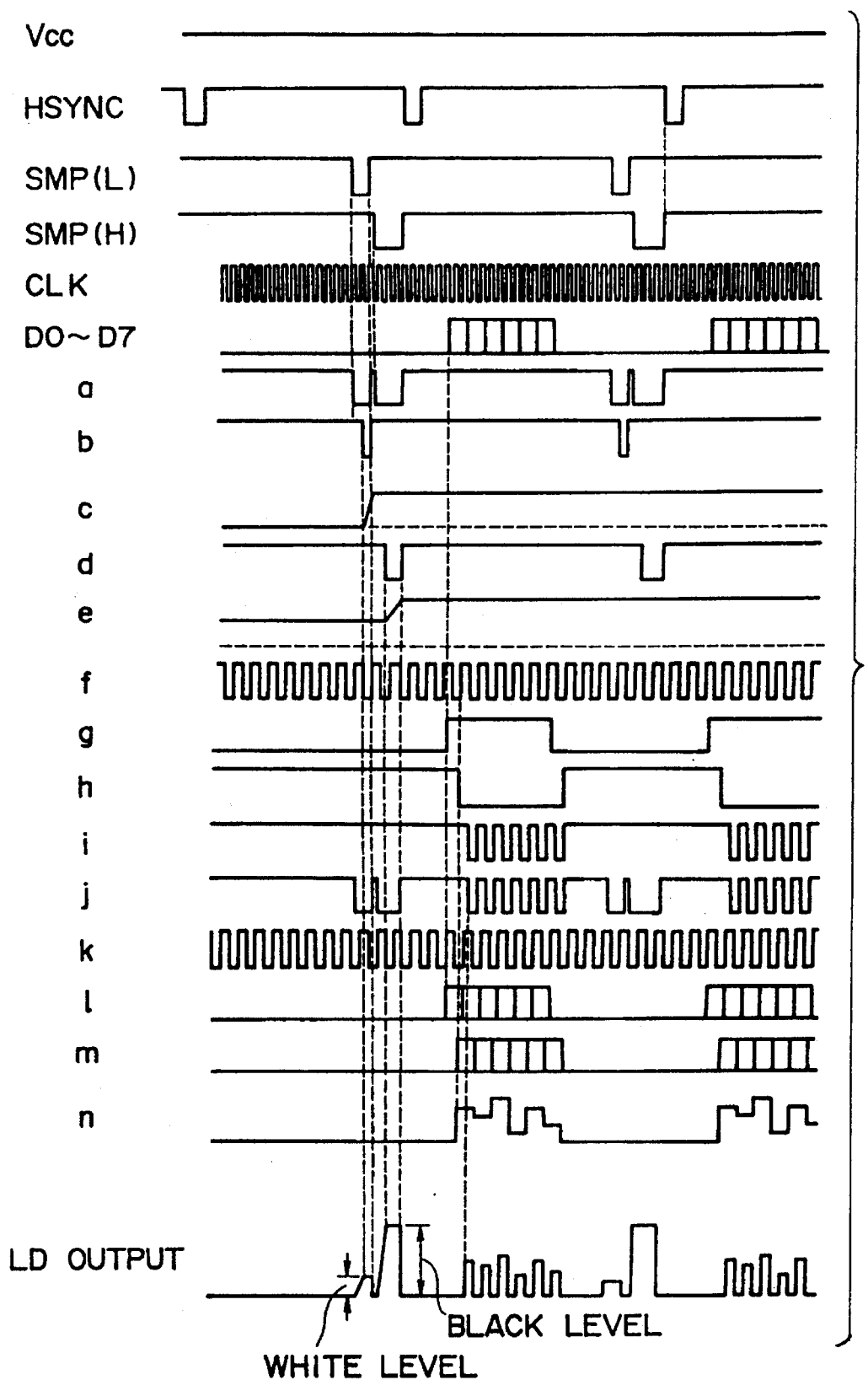
FIG. 5 shows a timing diagram for signals at various nodes in the circuit shown in FIG. 4.

The operation of the signal processor 101 will be described with reference to FIGS. 4 and 5.

When the imaging operation starts, as described above, with reference to FIG. 1A, the laser beam is reflected by the mirror 6 and is incident on the sensor 7, and the HSYNC pulse is generated.

A predetermined time interval after the first HSYNC pulse is generated, the white level timing signal SMP(L) is transmitted from the CPU to the intensity modulating circuit 10. The white level timing signal SMP(L) is input to the second OR circuit OR2, which then turns ON the second switch SW2, thus connecting the switch SW3 with the photodiode PD. Since the black level timing signal SMP(H) is not active, the third switch SW3 is connected to the white level comparator WLC, and thus the anode of the photodiode PD is connected to the negative input terminal of the white level comparator WLC. Further, the black level timing signal SMP(H) switches the fourth switch SW4, such that the output of the white level voltage setting unit WVS, signal 'c', is connected to the current source VI1. At the same time, the white level timing signal SMP(L) is input to the first OR circuit OR1, with the output signal 'j' thereof turning ON the first switch SW1. Thus, the laser diode LD is connected to the current sources VI1 and VI2. The photo diode PD receives the laser beam and outputs a current value which corresponds to the intensity of the received laser beam.

Thus the white level setting feedback control loop is established, and the white level can be set as described above.

When the black level timing signal SMP(H) is active, the 'j' signal outputted from the first OR circuit OR1 switches the first switch SW1 ON, and the laser diode LD emits the laser beam. Further, when the 'a' output signal of the second OR circuit OR2 is inputted, to the second switch SW2, the second switch SW2 is turned ON. Simultaneously, the third and the fourth switches SW3 and SW4 are switched; the third switch SW3 is switched such that an output of the photodiode PD is connected to the black level comparator BLC, and fourth switch SW4 is switched such that the output of the black level voltage setting unit BVS, signal 'e' is connected to the current source VI1. Then, the current source VI1 supplies current to the laser diode in accordance with the signal 'e'.

In this embodiment, the white level timing signal SMP(L) is delayed by the delay circuit DY1 before being applied (as signal 'b') to the white level voltage setting unit WVS. This ensures that the output signal of the white level comparator WLC is stable before the white level voltage setting unit WVS is activated.

Similarly, the black level timing signal SMP(H) is delayed (i.e., signal 'd') by the delaying circuit DY2 so that the output signal of the black level comparator BLC is stable before the black level voltage setting unit BVS is activated.

The operation of the latches LA1 and LA2 will be described below.

The clock signal CLK is always outputted, and divided in the first D-type flip-flop circuit FF1. The divided image clock 'f' is inputted to the AND circuit, passed through the first OR circuit OR1 as a signal 'i' and applied to the first switch SW1 as a signal 'j'. The divided clock 'f' image is also applied to the second latch circuit LA2 as a second latch timing signal. Further, the divided image signal 'f' is sent to the second D-type flip-flop FF2 and converted to a signal 'k' which is synchronous with the clock signal CLK, and then applied to the first latch circuit LA1 as a first latch timing signal.

With the above construction, the 8-bit image data D0–D7 is inputted to the first latch circuit LA1 as parallel data, the image data is latched for one cycle according to the first latch timing signal 'k'. If at least one of the data D0–D7 has a value 1, a signal 'g' (active HIGH) is inputted to the third D-type flip-flop circuit FF3 by way of the third OR circuit OR3. Then, signal "h" is transmitted to the AND circuit. Signal 'i' is then outputted from the AND circuit to control the first OR circuit OR1, with the first switch SW1 being turned ON to drive laser diode LD to emit a laser beam.

If all of the data D0–D7 is 0 (and therefore the white level signal is to be output), the signal 'g' output by the third OR circuit OR 3 will be low. Consequently, the switch SW1 will be turned OFF, and the current source VI1 will not supply current to the laser diode LD. In this way, the fog-phenomenon mentioned above, can always be avoided when a white image is to be formed.

Data '1' outputted from the first latch circuit LA1 is latched in the second latch circuit LA2, a ¾ cycle after the first latch timing signal 'k' in accordance with the second latch timing signal 'f'. Data 'm' outputted from the second latch circuit LA2 is converted to voltage signal 'n' by the D/A converter.

Figure 7:
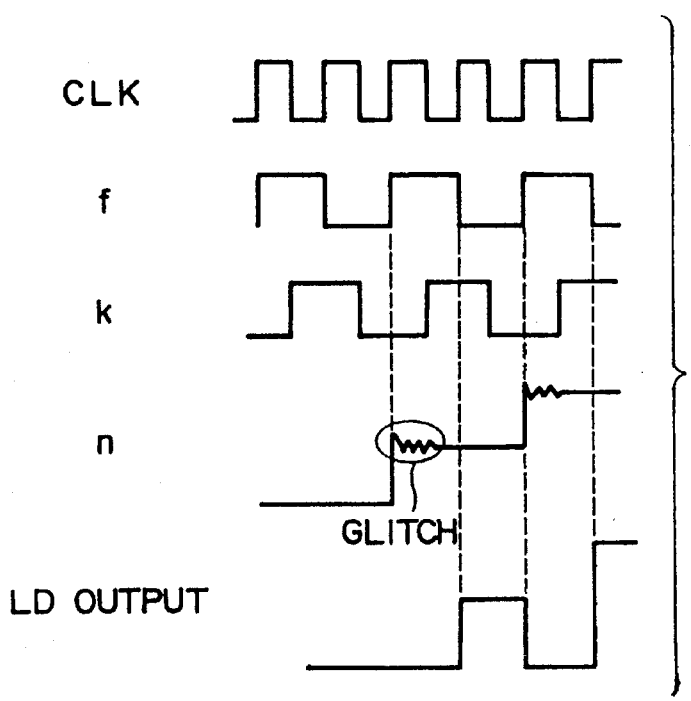
FIG. 7 shows another timing diagram for signals at various nodes in the circuit of FIG. 4.

The voltage signal 'n' may include a glitch as shown in FIG. 7. In order to cancel the effect of the glitch, the timing at which the switch SW1 is turned ON is delayed. For the period of the delay, the data D0–D7 should be latched by the second latch circuit LA2. Since the second latch circuit LA2 cannot receive the subsequent data while the data D0–D7 is latched therein, the first latch circuit LA1 holds the subsequently inputted data.

Furthermore, since there are two latch circuits, loss of image data is prevented, and the quality of the image formed can be improved.

As described above, the intensity modulating apparatus can set the white level intensity and black level intensity, independent of each other, and within a stable operating range of the laser diode. In this way, a high quality image can be formed, which does not have a fogged white level. Further, the white and black levels are determined for each scanning line, and therefore, changes in the ambient temperature can be compensated for very quickly.

The present disclosure relates to subject matter contained in Japanese Patent Application No. HEI 5-235366 filed on Aug. 28, 1993, which is expressly incorporated herein by reference in its entirety.

What is claimed is:

1. A light intensity control circuit for an optical scanning device, in which an intensity of a beam emitted by a laser diode is modulated in accordance with an image signal, said image signal including information about gradation levels of an image to be formed by said scanning device on a photoconductive surface, said control circuit comprising:

a first circuit for setting a first intensity value of said beam to correspond to a minimum gradation level of an image to be formed;

a second circuit for setting a second intensity value of said beam to correspond to a maximum gradation level of said image to be formed;

a driving circuit for driving said laser diode such that said intensity of said beam is determined in accordance with said image signal and a difference between said first intensity value and said second intensity value; and first and second latches, said second latch holding an image signal and said first latch holding a succeeding image signal while said driving circuit is setting said intensity.

2. The light intensity control circuit according to claim 1, further comprising a photodiode for detecting said intensity of said beam emitted by said laser diode, said first circuit comprising:

a first comparator for performing a comparison between said first intensity value and a first reference value, said comparator outputting a signal in accordance with said comparison; and a first driver for supplying current to said laser diode in accordance with said output signal of said first comparator, said second circuit comprising:

a second comparator for performing a comparison between said second intensity value and a second reference value, said comparator outputting another signal in accordance with said comparison; and a second driver for supplying current to said laser diode in accordance with said another output signal of said second comparator.

3. The light intensity control circuit according to claim 1, said driving circuit inhibiting said laser diode from emitting said beam when said image signal carries image data corresponding to said minimum gradation level.

4. The light intensity control circuit according to claim 1, said first intensity value being always above a predetermined threshold value, an operating characteristic of said laser diode being substantially linear between said first intensity value and said second intensity value.

5. A light intensity control circuit for an optical scanning device, in which an intensity of a beam emitted by a laser diode is modulated in accordance with an image signal, said image signal including information about gradation levels of an image to be formed by said scanning device on a photoconductive surface, said control circuit comprising:

a first circuit for setting a first intensity value of said beam to correspond to a minimum gradation level of an image to be formed, said minimum gradation level corresponding to a white image;

a second circuit for setting a second intensity value of said beam to correspond to a maximum gradation level of said image to be formed, said maximum gradation level corresponding to a black image;

said beam having 256 different intensity levels between said minimum gradation level and said maximum gradation level; and a driving circuit for driving said laser diode such that said intensity of said beam is determined in accordance with said image signal and a difference between said first intensity value and said second intensity value.

6. A method of setting an intensity of a laser beam used in a laser scanning unit for forming an image on a photoconductive surface in accordance with an image signal, said method comprising the steps of:

determining a first intensity value of said beam which corresponds to a minimum gradation level of an image to be formed;

determining a second intensity value of said beam which corresponds to a maximum gradation level of said image to be formed;

setting an intensity of said beam in accordance with said image signal and a difference between said first intensity value and said second intensity value;

holding an image signal while said intensity of said beam is being set; and holding a succeeding image signal while said intensity of said beam is being set.

7. The method of claim 6, further comprising the step of detecting said intensity of said beam emitted by said laser diode, said step of determining said first intensity value comprising the steps of:

performing a first comparison between said first intensity value and a first reference value;

outputting a signal in accordance with said first comparison; and supplying current to said laser diode in accordance with said output signal, said step of determining said second intensity value comprises the steps of:

performing a second comparison between said second intensity value and a second reference value;

outputting another signal in accordance with said second comparison; and supplying current to said laser diode in accordance with said another output signal.

8. The method according to claim 6, further comprising the step of inhibiting said laser diode from emitting said beam when said image signal carries image data corresponding to said minimum gradation level.

9. A light intensity control circuit for an optical scanning device, in which an intensity of each pixel of a beam emitted by a laser diode is modulated in accordance with an image that includes information about a gradation level of said each pixel, said control circuit comprising:

a first circuit for setting a first intensity value of said beam corresponding to a minimum gradation level of said pixel, said minimum gradation level of said each pixel corresponding to a white image;

a second circuit for setting a second intensity value of said beam corresponding to a maximum gradation level of said pixel, said maximum gradation level of said each pixel corresponding to a black image;

said beam comprising 256 different intensity levels corresponding to 256 gradation levels of said each pixel, said gradation levels of said each pixel extending between said white image and said black image; and a driving circuit for driving said laser diode such that said intensity of said beam for each said pixel is determined in accordance with said image signal and a difference between said first intensity value and said second intensity value.

10. The light intensity control circuit according to claim 9, said first intensity value being always above a predetermined threshold value, an operating characteristic of said laser diode is substantially linear between said first intensity value and said second intensity value.

* * * * *